United States Patent [19]
Tano et al.

[11] Patent Number: 5,850,058
[45] Date of Patent: Dec. 15, 1998

[54] INFORMATION PROCESSOR

[75] Inventors: Shunichi Tano, Chofu; Yasuharu Namba, Yokohama; Hirokazu Aoshima, Yokohama; Taminori Tomita, Yokohama; Hideki Sakao, Yokohama; Kiyoshi Kozuka, Yokohama, all of Japan

[73] Assignee: Hitachi, Ltd., Tokyo, Japan

[21] Appl. No.: 747,963

[22] Filed: Nov. 12, 1996

[30] Foreign Application Priority Data

Nov. 17, 1995 [JP] Japan ................................ 7-300032

[51] Int. Cl.⁶ .......................... G08C 21/00; G09G 3/02
[52] U.S. Cl. ........................... 178/18.01; 179/19.01; 345/179; 345/183; 382/188; 382/313
[58] Field of Search .................... 178/18, 19, 20; 345/179, 180, 181, 182, 183; 382/123, 188, 313, 314

[56] References Cited

U.S. PATENT DOCUMENTS

| | | | |
|---|---|---|---|
| 4,947,261 | 8/1990 | Ishikawa et al. | 382/313 |
| 5,051,736 | 9/1991 | Bennett et al. | 178/18 |
| 5,215,397 | 6/1993 | Taguchi et al. | 382/188 |
| 5,365,272 | 11/1994 | Siracusa | 348/426 |
| 5,502,568 | 3/1996 | Ogawa et al. | 345/179 |

FOREIGN PATENT DOCUMENTS

| | | |
|---|---|---|
| 0 162 461 | 11/1985 | European Pat. Off. . |
| 0 582 122 | 2/1994 | European Pat. Off. . |
| 62-176352A | 8/1987 | Japan . |
| 5-233125A | 9/1993 | Japan . |
| 6-131108A | 5/1994 | Japan . |
| 6-133264 | 5/1994 | Japan . |
| 6-133305 | 5/1994 | Japan . |
| 6-203195A | 7/1994 | Japan . |
| 713688A | 1/1995 | Japan . |
| 8-18922 | 1/1996 | Japan . |
| 8-163497 | 6/1996 | Japan . |

OTHER PUBLICATIONS

Human Interface 55–1 Group Ware 7–1, Jul. 14, 1994, pp. 1–8 (see Specification pp. 4, 5 and 6).

*Primary Examiner*—Curtis Kuntz
*Assistant Examiner*—Vijay Skankar
*Attorney, Agent, or Firm*—Kenyon & Kenyon

[57] ABSTRACT

It is an object to provide a computer system including a practical input device which can be operated with more natural sense. The present input pen which is used in combination with a tablet includes: a speech recognition unit for analyzing a speech sound, which is fetched in through a microphone, as a command or the like; an image reconfiguring unit for composing, after correcting image distortion generated due to inclination of the pen body for each image in the vicinity of a pen head which is photographed along with the strokes of the input pen by a CCD camera, the series of images into a general image; and a reference line generating circuit for lasing a laser beam with which a projected image utilized to calculate an angle of inclination is formed onto a face of an object of photographing. In addition, since an oscillation circuit generates a magnetic field corresponding to the data forming the general image on the basis of control by an a.c. magnetic field control circuit, the data can be transferred to the information processor side through the tablet. Further, a CPU executes the processing corresponding to the result of analyzing a sound.

7 Claims, 13 Drawing Sheets

(c)        (a)        (b)

160

INFORMATION PROCESSOR

BACKGROUND OF THE INVENTION

1. Field of the Invention

The present invention relates to an information processor employing a coordinate input unit which is employed as an input device of a computer system.

2. Description of the Related Art

In order to promote improvements in operability of units for a user in a computer system, as a new input device which is used instead of a keyboard, a mouse or the like, a tablet type input unit was adopted in some cases in which both a tablet and a pen type coordinate input unit are utilized. As for such a table type input unit, heretofore, there is well known a multi-media information input device or the like which is disclosed in JP-A-5-233125.

In the multi-media information input device disclosed in JP-A-5-233125, there are employed an input/display integrated tablet in which a plane display device (a liquid crystal panel) and a coordinate input unit (a pressure detectable tablet sensor) are provided integrally with each other, and a stylus pen self-containing a microphone for inputting therethrough speech sound data and a CCD camera for inputting therethrough image data. In accordance with the multi-media information input device of interest, a series of processings, from the process of photographing an image and of recording a speech sound to the process of fetching in image data and speech sound data in an information processor, in which the input devices dedicated thereto are conventionally required, respectively, can be carried out by only operating the stylus pen by a user.

However, the above-mentioned multi-media information input device has the disadvantage that it can not recognize the speech sound data, which has been fetched in through the microphone, as the meaningful command or the like. But, such a disadvantage can be cancelled if the technology relating to an information input unit disclosed in JP-A-6-131108 is applied thereto. The outline of this information input unit will hereinbelow be described.

The information input unit disclosed in JP-A-6-131108 includes a tablet type input unit employing a stylus pen to which both a microphone for inputting therethrough speech sound data and a transmission/reception unit for transmitting the speech sound data inputted through the microphone to the unit body are mounted, and a tablet serving also as a display device. In addition, the present input unit includes a processing unit for composing the speech sound data which has been transmitted from the transmission/reception unit of the stylus pen, and a character stream which has been inputted through the stylus pen in correspondence to the respective degrees of recognition in order to analyze the resultant composite data as a compound, data or the like.

In accordance with this technology, a user can input the data which has been obtained by merging the two different kinds of data (i.e., the character data inputted by operating the stylus pen and the speech sound data inputted through the microphone) with each other as the meaningful command or data to the information input unit side with a more natural sense. In addition, since the stylus pen further includes a memory for storing temporarily therein the speech sound data which has been inputted through the microphone until it is transmitted to the unit body, a user does not undergo the limit with respect to the place where the data input is carried out, the limit provided by the operation state of the unit body, and the like at all during the operation of inputting the data utilizing the stylus pen.

In addition, as for an input device similar thereto, there is well known a storage pen to which both a CCD camera for photographing an area in the vicinity of a pen head, and a memory for storing therein image data of the image which has been photographed by the CCD camera are mounted, the storage pen being disclosed in an article of The Special Interest Group Notes of IPSJ (Information Processing Society of Japan), Human Interface 55-1, pp. 1 to 8, 1994. This storage pen is such that a character stream or the like which is recorded on a page space or the like by a user are continuously photographed along with the strokes of the storage pen, and the resultant partial image data is successively stored in the memory. Incidentally, a series of partial image data thus accumulated is finally transferred to the storage pen information processor side. On the other hand, in the information processor side, the general image such as the character stream which is entered in the page space by the user is reproduced from the series of partial image data, which has been transferred from the storage pen side, on the basis of a program in which an algorithm used to reproduce the general image from the series of partial image data is defined.

In the above-mentioned conventional input units, the input device such as the CCD camera or the microphone is mounted to the stylus pen, thereby realizing the various functions. However, from the viewpoint of operability of the units for a user, there is sufficient room for improvement in each of the conventional input units.

For example, in the multi-media information input device disclosed in JP-A-5-233125, there is cancelled the inconvenience that the input device needs to be exchanged case by case. However, in this case, since the CCD camera is arranged in the rear portion of the stylus pen, a user needs to direct the pen head forward when inputting the characters, while the user needs to direct the rear portion of the pen forward when inputting the image. In such a way, the handling manner of the stylus pen needs to be changed whenever the function to be utilized is changed. This is a disadvantage.

In addition, the above-mentioned multi-media information input device has another disadvantage that when inputting the image, the user needs to pay close attention to the vibration of the stylus pen during use thereof, the handling manner of the stylus pen, and the like so as for the imaging plane of the CCD camera not to be inclined with respect to the face of an object of photographing.

The storage pen which is disclosed in The Special Interest Group Notes of information Processing Society of Japan, Human Interface 55-1, pp. 1 to 8, 1994 has the same disadvantages as those as described above.

In addition, the CCD camera mounted to the stylus pen does not cope with the operation of fetching in the image data continuously, and therefore, in the situation in which a large amount of information is contained in a medium such as a page space, and hence the stylus pen is poor in practicability. This is a disadvantage.

In the storage pen disclosed in The Special Interest Group Notes of Information Processing Society of Japan, Human Interface 55-1, pp. 1 to 8, 1994, that disadvantage is cancelled. However, for example, if the pen head is largely deviated from the position on the page space in order to move the pen head in the case where the character which has a complicated figure and a large number of strokes, or the like is entered, the continuity of the image reproduced from the partial image data is lost. As a result, the possibility that the proper general image is not reproduced on the information processor side is increased, and hence the storage pen is not suitable for the practical use. This is a disadvantage.

SUMMARY OF THE INVENTION

In the light of the foregoing problems associated with the prior art, it is therefore an object of the present invention to provide a practical input device which is capable of being operated with a more natural sense and a computer system employing the same.

In order to attain the above-mentioned object, according to the present invention, there is provided an information processor including a tablet type input unit having a pen for use in an input operation (hereinafter, referred to as "an input pen" for short, when applicable), and a tablet for detecting a position indicated by the input pen, wherein the input pen includes an image pickup circuit for photographing an area in the vicinity of a pen head of the input pen, a correction circuit for correcting distortion of an image photographed by the image pickup circuit, and a transmission unit for transmitting image data which is obtained by correcting the image by the correction circuit to the tablet, and wherein the information processor includes data detecting means for restoring the image data which has been transmitted to the table to an original image.

According to the present invention, since the input pen included in the present information processor includes the image pickup circuit in the position where the photographing of the area in the vicinity of the pen head can be carried out, when inputting an image utilizing the input pen, a user does not need to take the trouble to change the handling manner of the input pen from a time point when inputting the positional information. In addition, since the distortion of the image is properly corrected which is generated along with the inclination of the input pen with respect to a face of an object of photographing, the user does not need to worry about the vibration of the input pen, the handling manner of the input pen and the like so as for the image pickup device not to be inclined with respect to the face of an object of photographing at all. That is, the user can transmit, while using the tablet and the input pen as if the tablet and the input pen are respectively the page space and the pencile, the desired image data as the input data to the information processor to the information processor side through the tablet.

In addition, if there is provided general image producing means for composing a series of images, which have been continuously photographed by the CCD camera, into a general image maintaining continuity, even in the situation in which a large amount of information is contained on the face of an object of photographing, the practicability is not injured at all.

According to the present invention, since there is provided a practical input device which is capable of being operated with a more natural sense and a pen computer system employing the same, a user can carry out his/her work more efficiently.

BRIEF DESCRIPTION OF THE DRAWINGS

The above and other objects as well as advantages of the present invention will become clear by the following description of the preferred embodiments of the present invention with reference to the accompanying drawings, wherein.

DESCRIPTION OF THE PREFERRED EMBODIMENTS

The preferred embodiments of the present invention will hereinafter be described in detail with reference to the accompanying drawings.

In the present embodiment, as the basic input method for an information processor, a tablet input method is adopted in which the electromagnetic induction generated between a tablet and a stylus (hereinafter, referred to as "an input pen", when applicable) or the like is utilized. An input unit included in the present computer system will hereinbelow be described in detail on the assumption of the above-mentioned matter.

Firstly, the input pen will hereinbelow be described in detail with reference to FIGS. 1 and 2. Incidentally, a block which is realized by the process which is realized in turn on the basis of both the data stored in a memory 106 and a CPU 102, and a block representing a hardware included in the input pen are included in a configuration shown in FIG. 1.

Figure 2:
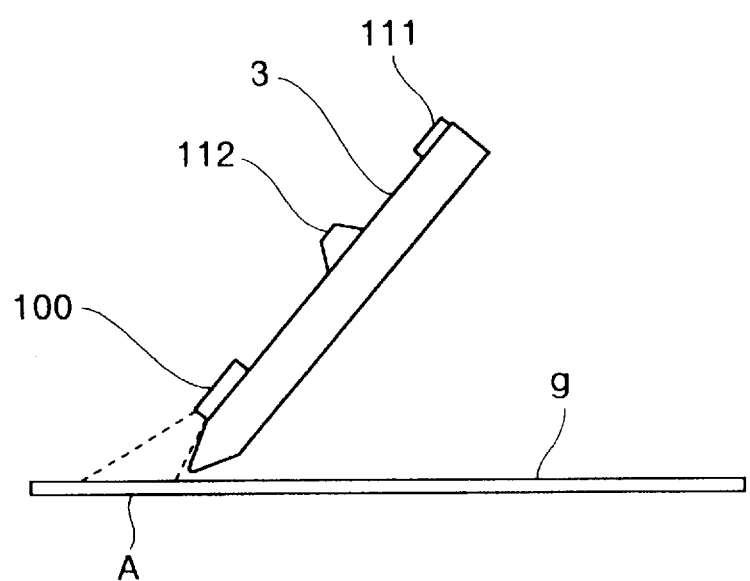
FIG. 2 is an exterior view showing a structure of the input pen shown in FIG. 1.

As shown in FIG. 2, a CCD camera 100 for photographing an area A in the vicinity of the pen head on a face g of an object of photographing, and a microphone 111 for fetching in therethrough sound data are mounted to a body portion 3 of the present input pen. In addition, the body portion 3 of the input pen is provided with a switch 112 for receiving an instruction issued from a user which is provided in a stylus employed in a general tablet type input unit. Incidentally, in the present embodiment, this switch 112 receives mainly instructions of start and end of photographing by the CCD camera 100.

Figure 1:
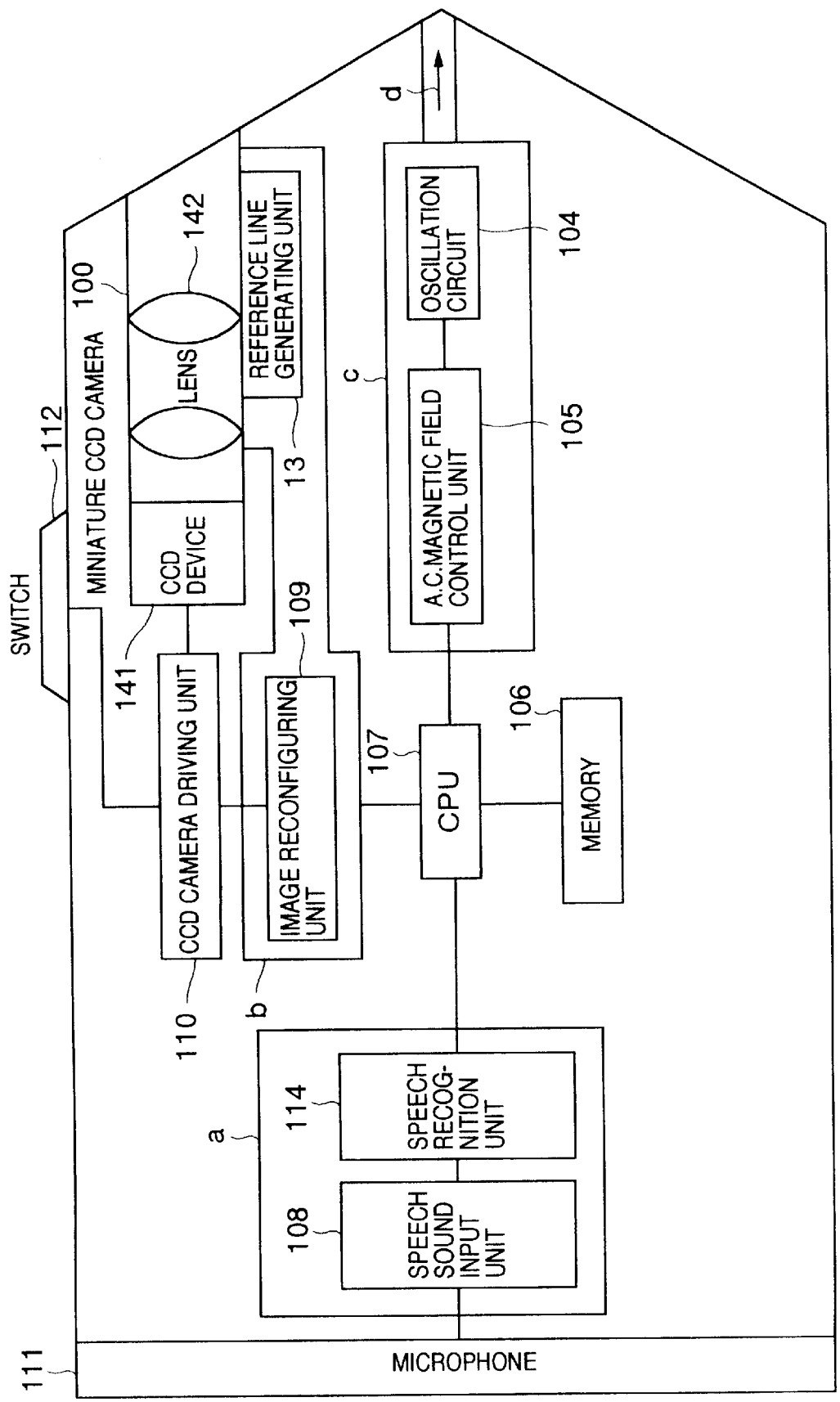
FIG. 1 is a block diagram showing a basic configuration of an input pen according to an embodiment of the present invention.
Figure 5:
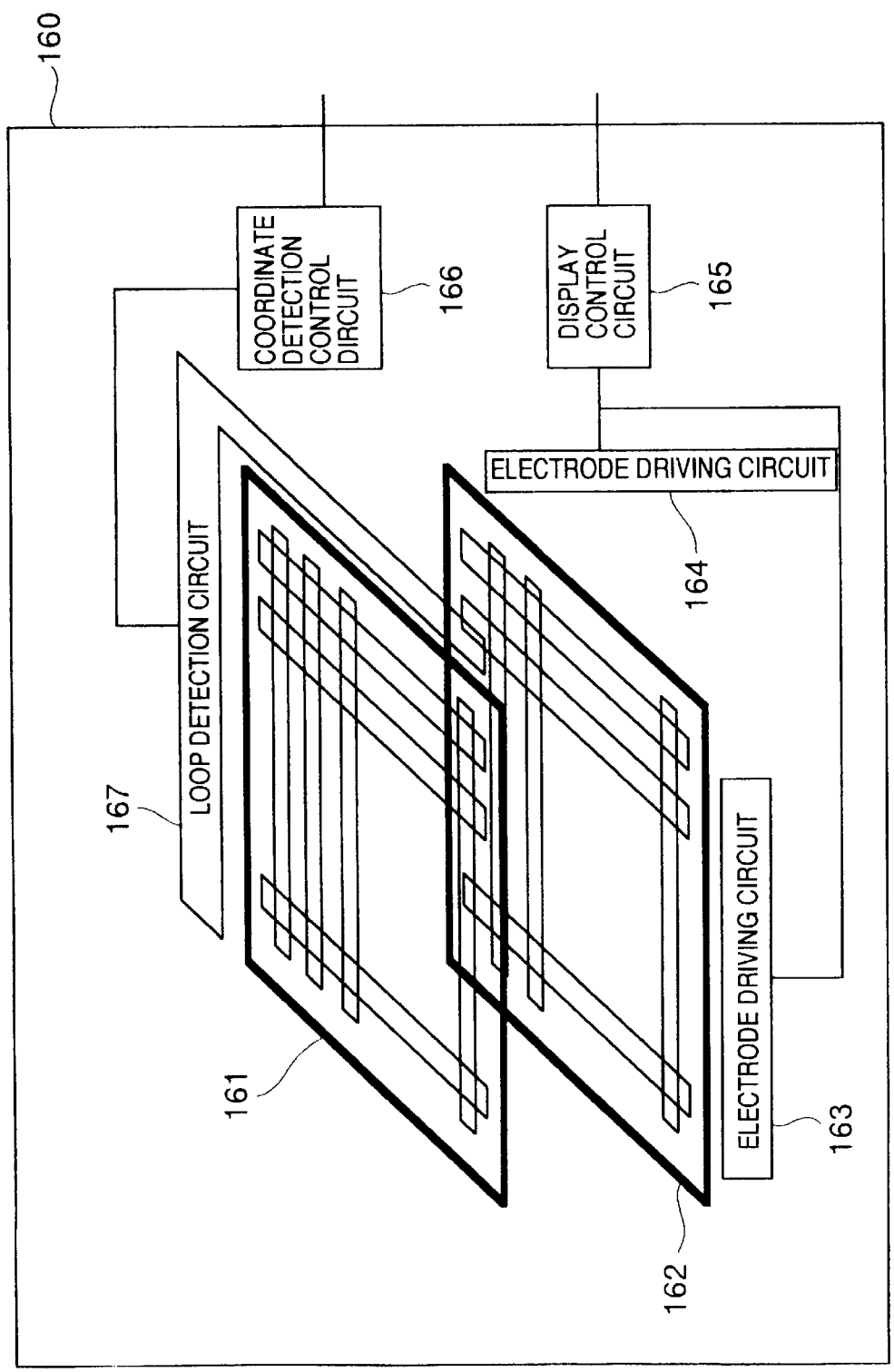
FIG. 5 is a perspective view, partly in block diagram, showing a basic structure of a tablet according to an embodiment of the present invention.

Now, as shown in FIG. 1, the input pen self-contains a CCD camera driving unit 110 for driving a CCD camera at suitable timing, a speech recognition portion a for executing the processing of recognizing speech sound data which has been fetched in through a microphone 111, an image correction portion b for subjecting image data which has been fetched in through the CCD camera 100 to the correction processing as will be described later, a magnetic field generating portion c for transferring data to a tablet shown in FIG. 5, a CPU 102 for controlling these portions, and a memory 106 for storing therein the speech sound data which have been fetched in through the microphone 111, and the like. Each of those portions will hereinbelow be described in detail in turn.

The speech recognition portion a includes a sound input unit 108 constituted by an A/D converter for subjecting the speech sound data which has been fetched in through the microphone 111 to the digital conversion and the like, and a speech recognition unit 114 for subjecting the digital data which has been obtained by subjecting the speech sound data to the digital conversion in the speech sound input unit 108 to Fourier transform, the pattern matching processing and the like, thereby analyzing the resultant data as the meaningful command or the meaningful data. Incidentally, the speech recognition unit 114 which is employed in the present embodiment is constituted by a speech analyzing LSI and the like which are normally used in the general audio recognition system.

Next, the magnetic field generating portion c will hereinbelow be described.

Figure 6:
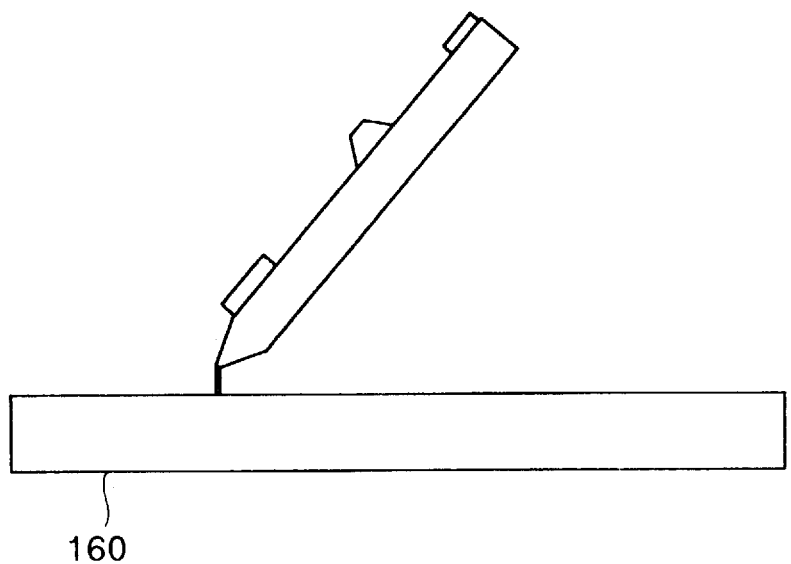
FIG. 6 is a view showing schematically the electromagnetic induction generated between the input pen shown in FIG. 1 and the tablet shown in FIG. 5.

The magnetic field generating portion c includes an oscillator circuit 104 for generating a magnetic field towards the front of the pen head of the input pen (in a direction indicated by an arrow d in the figure) or distributing the magnetic field in the vicinity of the pen head of the input pen, and an a.c. magnetic field controlling unit 105 for controlling the excitation cycle and the like of the oscillation circuit 104. Incidentally, when inputting the positional information to a tablet as will be described later, the a.c. magnetic field controlling unit 105 controls the oscillation circuit 104 in such a way that the oscillation circuit 104 generates a predetermined magnetic field similarly to the oscillation circuit mounted to the pen head of the stylus which is employed in the tablet input unit of the general electromagnetic induction type. On the other hand, when transferring the data to the information processor side through the tablet (refer to FIG. 6), the a.c. magnetic field controlling unit 105 controls the oscillation circuit 104 in such a way that the image data or the like to be transferred to the information processor side is converted into the magnetic data with which the original information can be restored in a data detection unit 128 (refer to FIG. 11) included in the information processor, and further a magnetic field is generated which is determined in correspondence to the magnetic data, or the magnetic field in the vicinity of the pen head is disturbed in correspondence to that magnetic data. Incidentally, the details if the data transfer will be described later.

Finally, the image correction portion b will hereinbelow be described.

The image correction portion b includes a reference line generating unit 113 for lasing a laser beam in a predetermined direction, i.e., towards the front of the pen head of the input pen synchronously with the driving timing for the CCD camera 100, and an image reconfiguring unit 109 for subjecting the image data which has been fetched in through the CCD camera 100 to the correction processing, as will be subsequently described, in correspondence to the distortion of the projected image generated by irradiation with the laser beam emitted from the reference line generating unit 113.

Figure 3A:
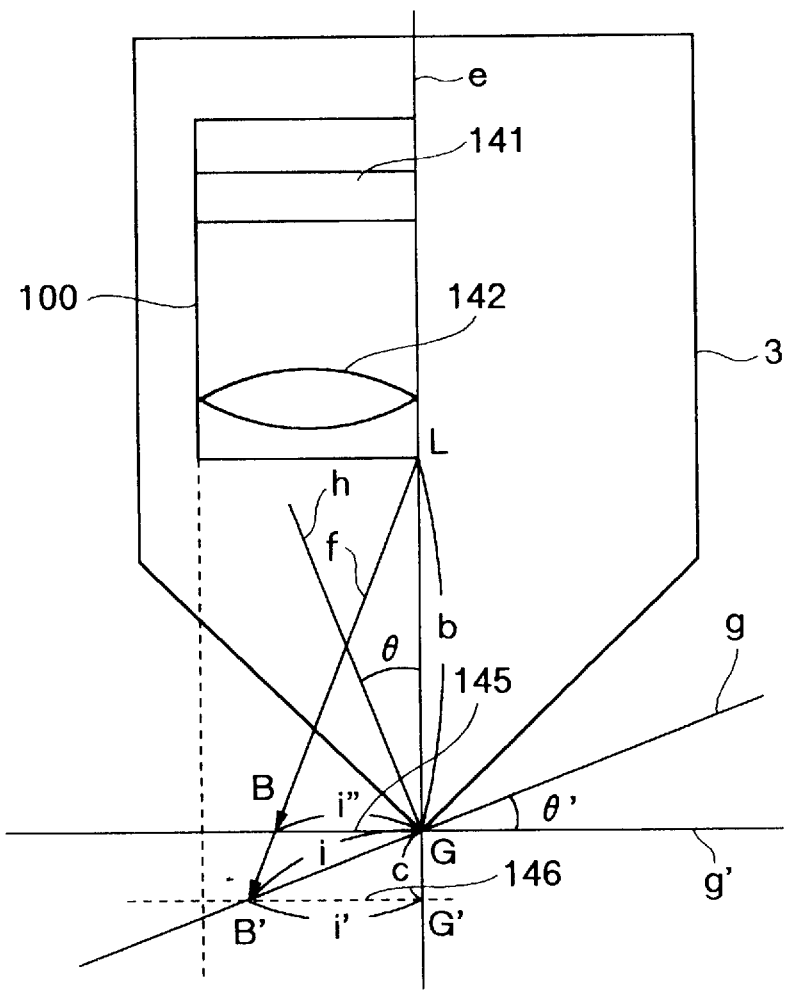
FIG. 3A is a schematic view useful in explaining the processing of correcting image data in the case where the input pen is inclined within a two-dimensional plane.

Now, the description will be given with respect to the correction processing, which is executed by the image reconfiguring unit 109, with reference to FIG. 3A. But, in FIG. 3A, for the sake of simplicity of the description, the CCD camera 100 is arranged in the vicinity of a central axis e of the body portion 3 of the input pen so as for the imaging plane of the CCD device 141 to be positioned perpendicular to the central axis e of the body portion 3 of the input pen, and also the reference line generating unit 113 is arranged so as for a laser beam f to be emitted from a position L on the central axis e of the body portion 3 of the input pen. In addition, the inclination of the body portion 3 of the input pen which is being used should be essentially grasped as the event in the three-dimensional space. However, the event in the three-dimensional space can be regarded as extension of the event in the two-dimensional space. Therefore, for the sake of simplicity of the description, the inclination of the body portion 3 of the input pen, which is being used, with respect to the face g of an object of photographing is managed as the event in the two-dimensional space here.

Now, as shown in FIG. 3, in the case where the pen head G contacts with the face g of an object of photographing with the central axis e of the body portion 3 of the input pen inclined at an angle of inclination θ with respect to a normal h to the face g of an object of photographing, the laser beam f emitted from the reference line generating unit 113 is lased to the face g of an object of photographing to form a projected image B'. At this time, since the angle of inclination θ is formed between the imaging plane of the CCD device 141 and the face g of an object of photographing, the projected image B' which has been projected on the position which is actually a distance i away from the pen head G on the face g of an object of photographing is photographed as an image in the position which is a distance i' away from the pen head by the CCD camera 100.

Now, if as an auxiliary plane in the following calculations, a plane g' is arranged which passes through the pen head G and also is perpendicular to the central axis e of the body portion 3 of the input pen, the angle of inclination θ of the input pen with respect to the face g of an object of photographing becomes equal to an angle θ' which is formed between the face g of an object of photographing and the auxiliary plane g'. As a result, the following expression is established:

$$\tan \theta' = \tan \theta = c/i' \quad (1)$$

In addition, if the position where the laser beam f passes through the auxiliary plane g' is represented by reference symbol B and the foot of the perpendicular from the projected image B' to the central axis e of the input pen is represented by reference symbol G'. Since a triangle B'LG' is a similar figure of a triangle BLG, the following expression is obtained:

$$c = b(1 - i'/i'') \quad (2)$$

where i" represents a distance between the position B and the position G.

From the above-mentioned two expressions, the angle of inclination θ of the body portion 3 of the input pen can be expressed by the following expression:

$$\theta = \tan^{-1} b(1/i' - 1/i'') \quad (3)$$

Therefore, in the image which is photographed by the CCD camera 100, the correction based on the following expression is carried out for a component j' of each position vector having the position G of the pen head as a starting point, whereby the error contained in the image data, i.e., the distortion of the image which is generated due to the inclination of the body portion 3 of the input pen with respect to the face g of an object of photographing is cancelled. As a result, by carrying out such correction, the more proper image data can be produced.

$$c'' = c'/\sin\theta \quad (4)$$

Incidentally, the image data which has been subjected to such a correction processing is then stored in the memory 106.

Figure 3B:
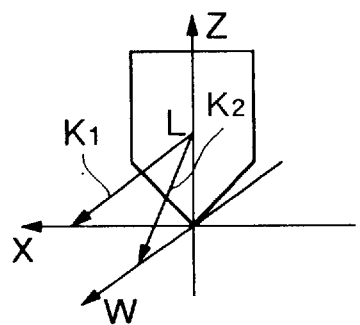
FIG. 3B is a schematic view useful in explaining the processing of correcting image data in the case where the input pen is inclined within a three-dimensional plane.

Now, in the above description, the direction of inclination of the body portion 3 of the input pen is limited within the two-dimensional plane. As described above, however, the inclination of the body portion 3 of the input pen during the actual use of the input pen needs to be managed as the event in the three-dimensional space. For this reason, in order to cope with such a situation, as shown in FIG. 3B, laser beams k1 and k2 are lased to the x-y plane as the face q of an object of photographing from at least different two directions so that the correction processing based on the expression (4) may be carried out for each of the laser beams k1 and k2.

Figure 4:
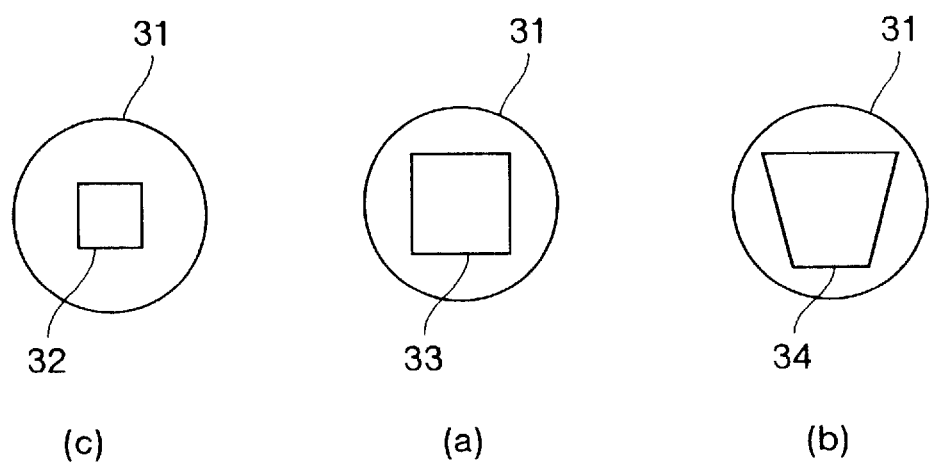
FIGS. 4A to 4C are schematic views showing examples of projected patterns generated by irradiation with a laser beam which is emitted from a reference line generating unit shown in FIG. 1.

Alternatively, it may be utilized that the area of application of the laser beam k on the face g of an object of photographing is deformed in correspondence to both the direction of inclination and the angle of inclination of the body portion 3 of the input pen. More specifically, projected images having respective predetermined FIGS. 33 and 34 as shown in FIGS. 4A and 4B, for example, may be projected on the face g of an object of photographing by application of the laser beam f, and also on the basis of a deformation state of the images of the projected images 33 and 34 which are respectively observed on an image 31 which is photographed by the CCD camera 100, both the direction of inclination and the angle of inclination of the body portion 3 of the input pen which are required for carrying out the correction processing on the basis of the expression (4) may be extracted. In addition, in the case where the deformation of the projected images 33 and 34 is utilized, the positional relationship between the face g of an object of photographing and the pen head G of the input pen can also be judged on the basis of the size of the image of the projected image which is observed in the image 31 photographed by the CCD camera 100. For example, in the case where the projected image having a FIG. 33 shown in FIG. 4A is projected on the face g of an object of photographing, if the projected image 33 is observed so as to have the FIG. 32, as shown in FIG. 4C, which is obtained by reducing uniformly the original figure, in the image 31 which is photographed by the CCD camera 100, then the pen head G of the input pen can be judged to be floated from the face g of an object of photographing.

The description with respect to the input pen has been completed, and then the description will hereinbelow be given with respect to a hardware configuration of the tablet which is used with the input pen with reference to FIG. 5. But, the tablet has a configuration similar to that of the tablet which is employed in the tablet input unit of the general electromagnetic induction type, and therefore, only the outline thereof will be described here for the sake of simplicity. In addition, the tablet 160 is actually used in a state of being incorporated in the information processor body.

A data input face of the present tablet 160 has a two-layers structure in which a liquid crystal display panel 162 for carrying out the data display is piled up on a tablet sensor 161 for detecting the change in a magnetic flux generated between the data input face and the pen head of the input pen, i.e., the magnetic field generated between the data input face and the pen head of the input pen or the disturbed magnetic field.

Figure 11:
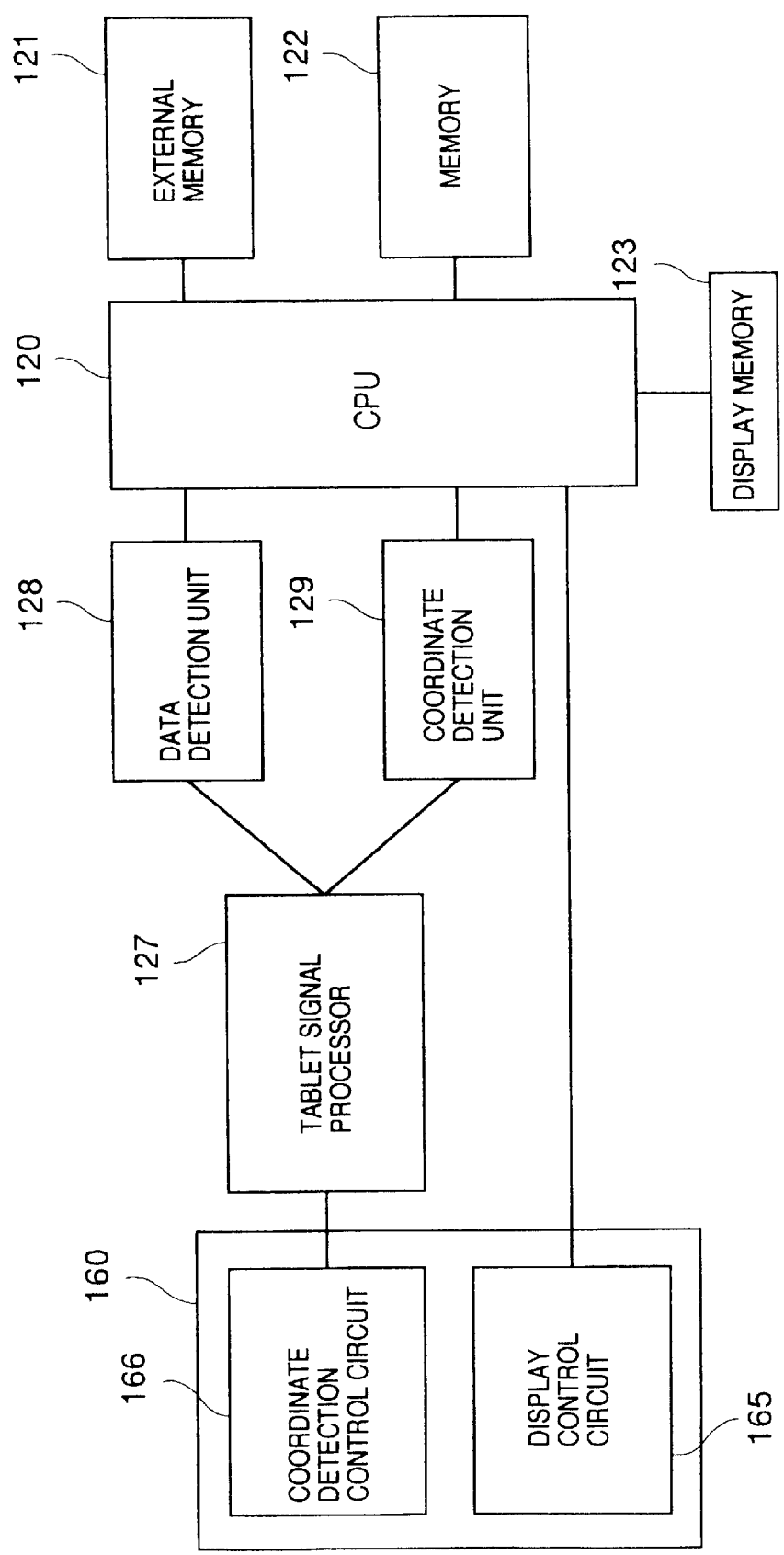
FIG. 11 is a block diagram showing a basic configuration of an information processor according to an embodiment of the present invention.

The liquid crystal display panel 162 displays the image data, which is stored in a display memory 123 shown in FIG. 11, as the visible image by utilizing the change in the optical characteristics (the reflection power and the like) of liquid crystal which is generated in correspondence to the magnitude of the voltage which is applied thereto by electrode driving circuits 163 and 164. Incidentally, each of the electrode driving circuits 163 and 164 is controlled by a display control circuit 165 so as to apply the suitable voltage to liquid crystal which is previously injected into the liquid crystal display panel 162.

In addition, parallel scanning lines constituting a plurality of loops are distributed on the tablet sensor 161. A loop detection circuit 167 is controlled by a coordinate detection control circuit 166 so as to detect, for each loop, an induced voltage which is generated by the influence of the magnetic field generated from the oscillation circuit mounted to the pen head of the input pen, or the influence of the magnetic field disturbed by the oscillation circuit mounted to the pen head of the input pen, thereby detecting a maximum induced voltage and also detecting the loop position where the maximum induced voltage is detected.

Now, in the present computer system, as described above, by utilizing the electromagnetic induction (refer to FIG. 6) generated between the pen head of the input pen and the tablet 160, the input of the positional information similar to that in the tablet input unit of the general electromagnetic induction type is made possible, and in addition thereto, the transfer of the image data and the like which have been fetched in on the input pen side to the information processor side through the tablet 160 is made possible. These processings will hereinbelow be described.

Firstly, the description will now be given with respect to the processing of fetching in the image data through the CCD camera 100 which is carried out on the input pen side.

Figure 7:
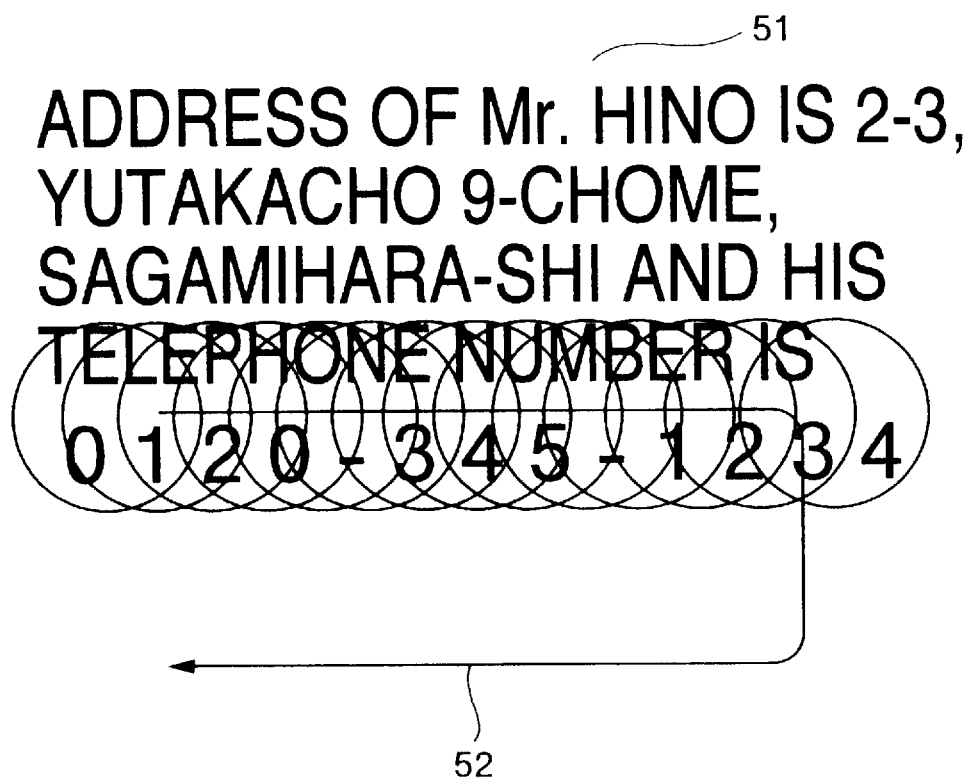
FIG. 7 is a view showing schematically the strokes of the input pen when photographing an image.

As shown in FIG. 7, when the input pen is moved along a path on the face g of an object of photographing in which a character stream 51 and the like are entered, along with the strokes of the input pen, the CCD camera 100 photographs partially the character stream 51, which is entered in the face g of an object of photographing, successively. As a result, after image data of each area surrounded by the associated circle in the figure (hereinafter referred to as "partial image data" for short, when applicable) has been fetched in time series, and the above-mentioned correction processing has been executed therefor in the image reconfiguring unit 109, the resultant image data is stored in the memory 106 successively.

In addition, the CPU 107 produces, in accordance with a general image producing program in which the algorithm is defined which is used to reproduce the general image from a series of partial image data which has been continuously fetched in through the CCD camera 100, image data forming the general image (hereinafter, referred to as "general image data" for short, when applicable) from the series of partial image data. The processing at this time will hereinbelow be described with reference to FIG. 8.

Firstly, in Step 401, two buffers a and b for buffering the partial image data which has been fetched in through the CCD camera 100 (hereinafter, each referred to as "a buffer for a partial image" for short, when applicable) are allocated in the memory 106. At the same time, two buffers c and d for buffering the image data, of the projected image generated by irradiation with the laser beam f, which has been fetched in through the CCD camera 100 (hereinafter, each referred to as "a buffer for a projected image" for short, when applicable) are secured therein. Next, the processings following the processing in Step 402 are repeatedly executed as long as the continuation of the photographing by the CCD camera 100 is judged in Step 402.

Now, if the photographing is judged to be continued in Step 102, then, after the same partial image data as that stored in one buffer a for a partial image has been stored in the other buffer b for a partial image in Step 403, the partial image data which has been fetched in through the CCD camera 100 is newly stored in the buffer a for a partial image. Incidentally, at this time, if in Step 404, the projected image which is obtained by irradiation with the laser beam f is formed on the face g of an object of photographing and the image including the projected image is photographed by the CCD camera 100, after the same partial image data as that stored in one buffer c for a projected image has been stored in the other buffer d for a projected image in Step 405, the partial image data which has been fetched in at this time is newly stored in the buffer c for a projected image. Next, in Step 406, by comparing the new partial image data and the old partial image data with each other which are respectively stored in the two buffers for a projected image, the angle of inclination of the input pen with respect to the face of an object of photographing is calculated and also the space between the pen head of the input pen and the face of an object of photographing is calculated. Next, in Step 407, on the basis of the results thus calculated, the above-mentioned correction processing is executed for the newest partial image data which is stored in the buffer a for a partial image. Next, in Step 408, by comparing the new partial image data and the old partial image data with each other which are respectively stored in the two buffers a and b for a partial image, the overlapping area of the two images is detected and a movement amount of input pen is calculated. Next, in Step 409, the newest partial image data stored in the buffer a for a partial image and the general image data stored in the memory 106 are composed in such a way that the area, other than that overlapping area, out of the image formed by the newest partial image data which is stored in the buffer a for a partial image is suitably linked with the image formed by the general image data which was produced in the repetitive processings before Step 409 and has been stored in the memory 106, i.e., both the images are shifted by a movement amount of input pen thus calculated, and the resultant composite image data is stored as a new general image data in the memory 106. Thereafter, the processing is returned back to Step 402.

In the case where after having executed repeatedly those processings, the data relating to completion of photographing issued from the user is received, at the time when returning back to Step 402, it is judged whether or not the photographing by the CCD camera 100 is completed. At this time, if the user positions the input pen on the tablet and also instructs the data to be transferred to the CPU 102, the processing subsequent to the processing in Step 410, i.e., the transfer of the general image data stored in the memory 106 is started. Thus, since the processings in the input pen are independent of the information processor side, the user can carry out his/her work without warrying about the operation state of the information processor, his/her work place and the like so long as the user carries the input pen. Incidentally, the processing relating to transfer of the general image data which is executed in this course will be described later.

In addition, the procedure may be adopted in which a time point when the pen head of the input pen is distouched from the face g of an object of photographing is detected on the basis of the space defined between the pen head of the input pen and the face g of an object of photographing, which is calculated in step 406, and the processing according to the above-mentioned general image producing program is executed for every partial image data group which is classified before and after the time point of distouch. As a result, since the image data can be produced from which the image maintaining continuity can be reproduced, it is possible to reduce the possibility that the image is misidentified in the course of the processing in FIG. 8 which will be described later. Therefore, the possibility that at least the unsuitable image data and the like are transferred to the information processor side.

Figure 8:
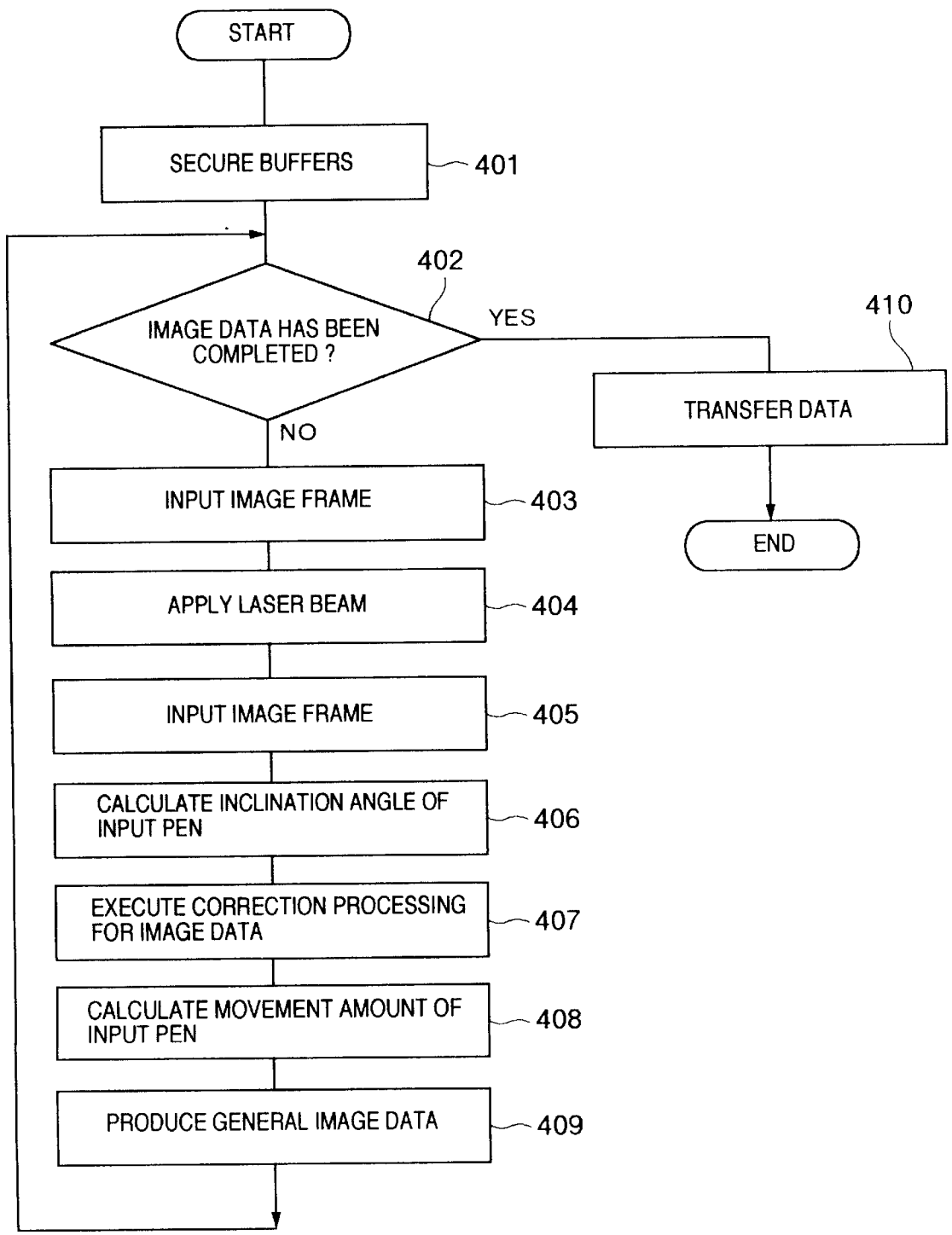
FIG. 8 is a flow chart showing a flow of the processing when fetching in image data by the input pen shown in FIG. 1.
Figure 9:
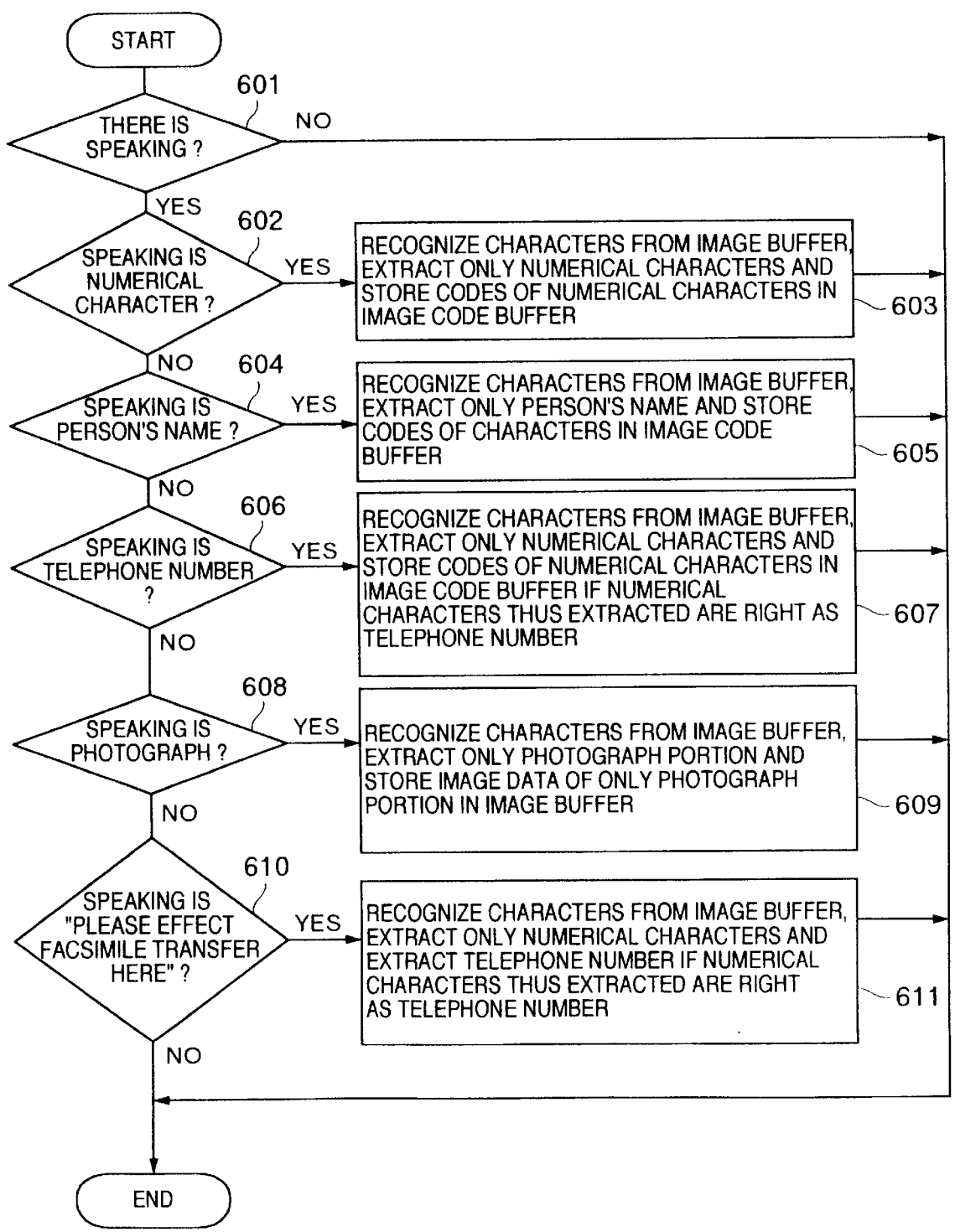
FIG. 9 is a flow chart showing a flow of the processing of extracting only the image data forming the specified image from the general image data which has been produced by the processing shown in FIG. 8.

Now, in the processing shown in FIG. 8, if it is the course until the transfer of the general image data of this sort has been started, then the user can specify the image of a specific object for photographing to be an object of transfer by his/her speech. The description will hereinbelow be given with respect to the processing of realizing the above-mentioned matter which is executed on the input pen side with reference to FIG. 9. But, it is assumed that the script in which the recognition processing for cutting down only the image of the object for photographing out of the images photographed by the CCD camera 100 is defined is previously stored in the memory 106 of the input pen.

Firstly, at the time when the speaking of the user is fetched in as the speech sound data through the microphone 111 of the input pen in Step 601, the CPU 107 executes the processing corresponding to the result of analyzing the speech sound data which is carried out in the speech recognition portion a. That is, if the speech recognition portion a recognizes the word given by the user as "a numerical character" in Step 602, then only the image data forming the numerical character is extracted from the general image data which is finally stored in the memory 106 in Step 603. In addition, as the data to be transferred in Step 410 shown in FIG. 8, the code representing that the extracted image data is the numerical character is stored together with the image data in the memory 106.

On the other hand, if the speech recognition portion a recognizes the word other than the numerical character in Step 602, then the processing subsequent to Step 602 will be executed. That is, if the speech recognition portion a recognizes the word given by the user as "a person's name" in Step 604, then only the image data forming the character stream representing the person's name is extracted from the general image data which is finally stored in the memory 106 in Step 605. In addition, as the data to be transferred in Step 410 of FIG. 8, the code representing that the extracted image data is the person's name is stored together with that image data in the memory 106.

On the other hand, if the speech recognition portion a recognizes the word other than the person's name in Step 604, then the processing subsequent to Step 604 will be executed. That is, if the speech recognition portion a recognizes the word given by the user as "a telephone number" in Step 606, then only the image data forming the character stream representing the telephone number is extracted from the general image data which is finally stored in the memory 106 in Step 607. In addition, as the data to be transferred in Step 410 of FIG. 8, the code representing that the extracted image data is the telephone number is stored together with that image data in the memory 106.

On the other hand, if the speech recognition portion a recognizes the word other than the telephone number in Step 606, then the processing subsequent to the processing in Step 606 will be executed. That is, if the speech recognition portion a recognizes the word given by the user as "a photograph" in Step 608, then only the image data of the photograph will be extracted from the general image data which is finally stored in the memory 106 in Step 609. In addition, as the data to be transferred in Step 410 of FIG. 8, the code representing that the extracted image data is the photograph is stored together with that image data in the memory 106.

On the other hand, if the speech recognition portion a recognizes the word other than the photograph, e.g., the word corresponding to the command in Step 608, then the processing subsequent to the processing in Step 608 will be executed. That is, if the speech recognition portion a recognizes that the word given by the user is a command in Step 610, then the processing corresponding to the word thus recognized will be executed in Step 611. For example, if the user speaks "please effect facsimile transfer here", then the suitable processing is executed in such a way that only the character stream representing the telephone number is extracted from the general image data which is finally stored in the memory 106, and the FAX command is executed with the telephone number as the destination for transfer in the information processor side.

As described above, when the present input unit is used, if only the user speaks the word corresponding to the image to be an object of transfer while following the character stream or the like, which are entered in the face g of an object of photographing using the input pen, the user can specify the specific image to be an object of transfer out of all the images photographed by the CCD camera 100.

Therefore, even if the input pen is relatively roughly used, the data forming the unnecessary image is not contained in the data to be transferred at all. In addition, when the present input pen is used, if only the user speaks the word corresponding to the specific command, the user can instruct the specific command, in which the information given by the image photographed by the CCD camera 100 is a parameter, to be executed.

Incidentally, in the present embodiment, the words which are recognized as the classification names of the images of the objects for photographing to be extracted are limited to the numerical character, the person's name, the telephone number and the photograph. However, it is to be understood that those words are shown as examples for the description. Therefore, the words corresponding to the objects for photographing other than those objects for photographing may also be recognized as the classification names of the objects for photographing to be extracted.

Figure 10:
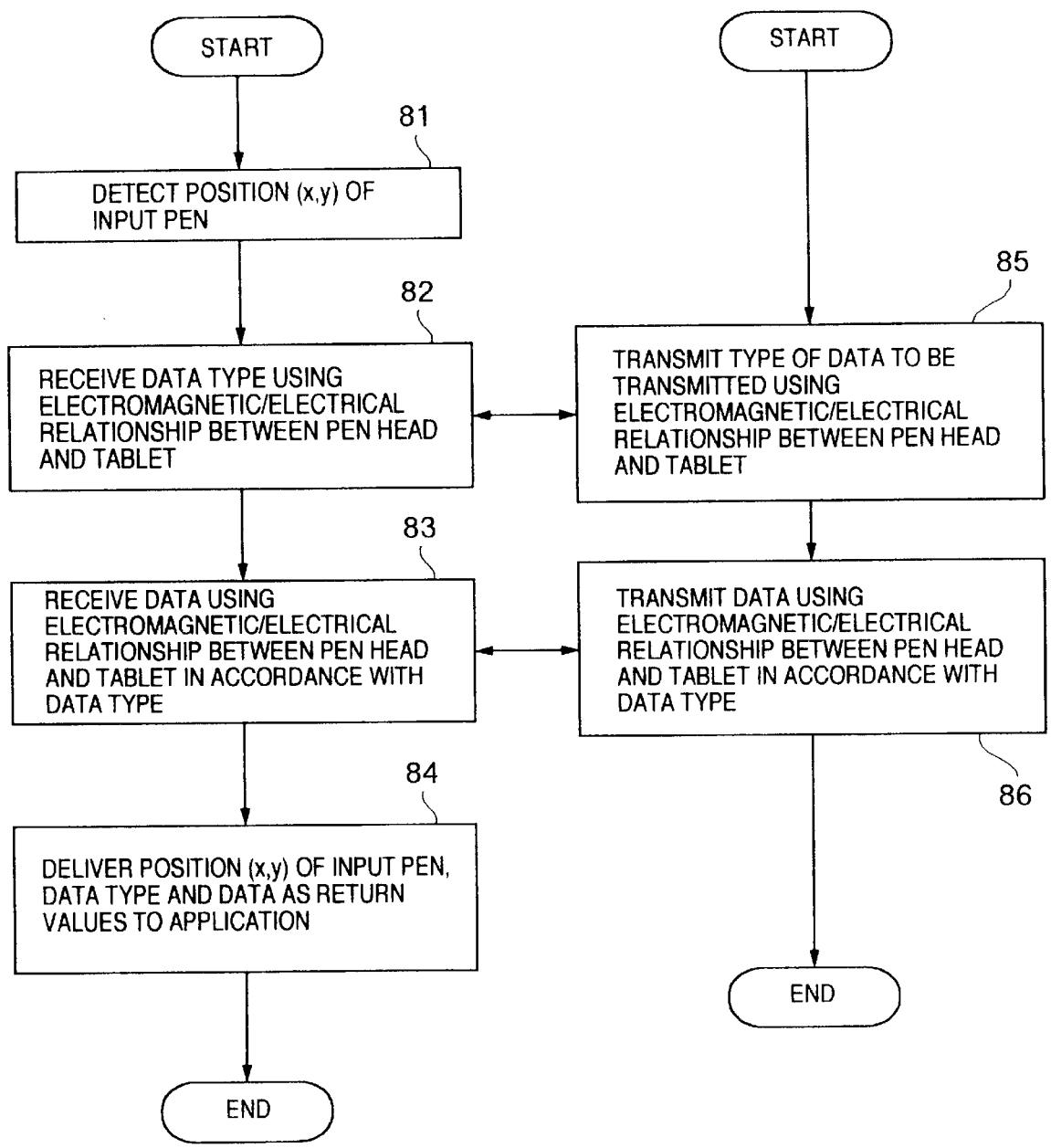
FIG. 10 is a flow chart showing a flow of the processing of transferring data from the input pen side of FIG. 1 to the information processor side through the tablet shown in FIG. 5.

The description of the processing of fetching in the image data through the CCD camera 100 which is executed on the input pen side has been completed. Then, the description will hereinbelow be given with respect to the processing of transferring the general image data which is fetched in such a way to the information processor side through the tablet 160 as described above (the processing executed in Step 410 in FIG. 8) with reference to FIG. 10. But, it is assumed that the information processor for receiving the data transferred thereto through the tablet 160 includes:, as shown in FIG. 11, a tablet signal processor 127 for separating the subsequently executed processing in correspondence to the maximum induced voltage which has been detected in a loop detection circuit 167 of the tablet 160; a coordinate detection portion 129 for calculating two-dimensional coordinates of the loop position which has been detected, as the input coordinates inputted by the input pen, in the loop detection circuit 167 in accordance with the instruction issued from the tablet signal processor 127; and a data detection portion 128 for restoring the image data, which has been transferred thereto from the input pen side, on the basis of the maximum induced voltage, which has been detected by the loop detection circuit 167, in accordance with the instruction issued from the tablet signal processor 127. Incidentally, each of those blocks actually corresponds to the process which is realized by both a CPU 120 and the data stored in the memory 122.

Now, at the time when the user positions the input pen on the tablet in Step 81, the loop detection circuit 167 of the tablet detects the maximum induced voltage which is generated in the associated one of the parallel scanning lines distributed on the tablet sensor 161. In addition, at this time, the loop detection circuit 167 also detects the loop position where the maximum induced voltage is detected. Next, at the time when the user instructs the data transfer to be started through the switch 112 or the like of the input pen on the input pen side in Step 85, firstly, the codes of the image data which has been stored in the memory 106 through the processing of fetching in the above-mentioned image data are converted into the magnetic data in the magnetism generating portion c.

Next, the oscillation circuit 187 is excited in such a way that the magnetic field is generated which is determined in correspondence to that magnetic data, or the magnetic field in the vicinity of the pen head of the input pen is disturbed in correspondence to that magnetic data. During this course, i.e., in Step 82, the maximum induced electromotive force induced due to the influence of such a magnetic field is detected by the loop detection circuit 167 all the time.

Subsequently, in Step 85, the image data which has been stored in the memory 106 through the processing of fetching in the above-mentioned magnetic data is converted into the magnetic data in the magnetism generating portion c on the input pen side, and then the oscillation circuit 187 is excited in such a way that the magnetic field is generated which is determined in correspondence to that magnetic data or the magnetic field in the vicinity of the pen head of the input pen is disturbed in correspondence to that magnetic data.

During this course, i.e., in Step 83, the maximum induced electromotive force induced due to the influence of such a magnetic field is detected by the loop detection circuit 167 all the time on the tablet 160 side. Thus, on the side of the information processor which has received the data transferred thereto through the tablet 160, the tablet signal processor 127 selects the succeeding processings in correspondence to the maximum induced voltage which has been detected by the loop detection circuit 167.

That is, in the case where that maximum induced voltage is induced due to the influence of the predetermined magnetic field which has been generated from the oscillation circuit 187 of the input pen during input of the positional information or the influence of the predetermined magnetic field which has been disturbed by the oscillation circuit 187, the two-dimensional coordinates of the position of the loop which has been detected by the loop detection circuit 167 in Step 81 are calculated as the input coordinate values inputted by the input pen in the coordinate detection portion 129.

On the other hand, in any case other than the above-mentioned case, both the image data and the codes which have been transferred from the input pen side are restored on the basis of the maximum induced voltages which have been detected by the loop detection circuit 167 in Step 82 and Step 83, respectively, in the data detection portion 128.

Incidentally, the input coordinate values, the data and the codes thus obtained are, if necessary, stored in the display memory, the memory 122 or an external memory 121, or are supplied as the input data to the application which is being activated. Incidentally, if the position on the tablet for displaying the image reproduced from the image data stored in the display memory is given on the basis of the position on the tablet in which the input pen is positioned in Step 81, the user can carry out both the transfer of the image data and the specification of the image display position on the tablet by one work.

The description relating to the processing of transferring the general image data to the information processor side has been completed. Incidentally, while the general image data is given as the data to be transferred to the information processor side here, that data does not need to be necessarily the general image data. For example, even the image data specified by the user which is fetched in through the processings shown in FIG. 9, the sound data which is fetched in through the microphone, or the like may be transferred to the information processor side by the same processings.

Now, the above-mentioned sound recognition processing and image correction processing do not need to be necessarily executed on the input pen side as has been described, and hence may be executed on the information processor side. The description will hereinbelow be given with respect to the configurations of the input pen and the information processor in that case with reference to FIGS. 12 and 13. But, the specific case where radio communication devices 190 and 208, and communication controllers 191 and 207 for controlling the respective radio communication devices 190 and 208 are respectively mounted to the input pen and the information processor is given as an example here.

Figure 12:
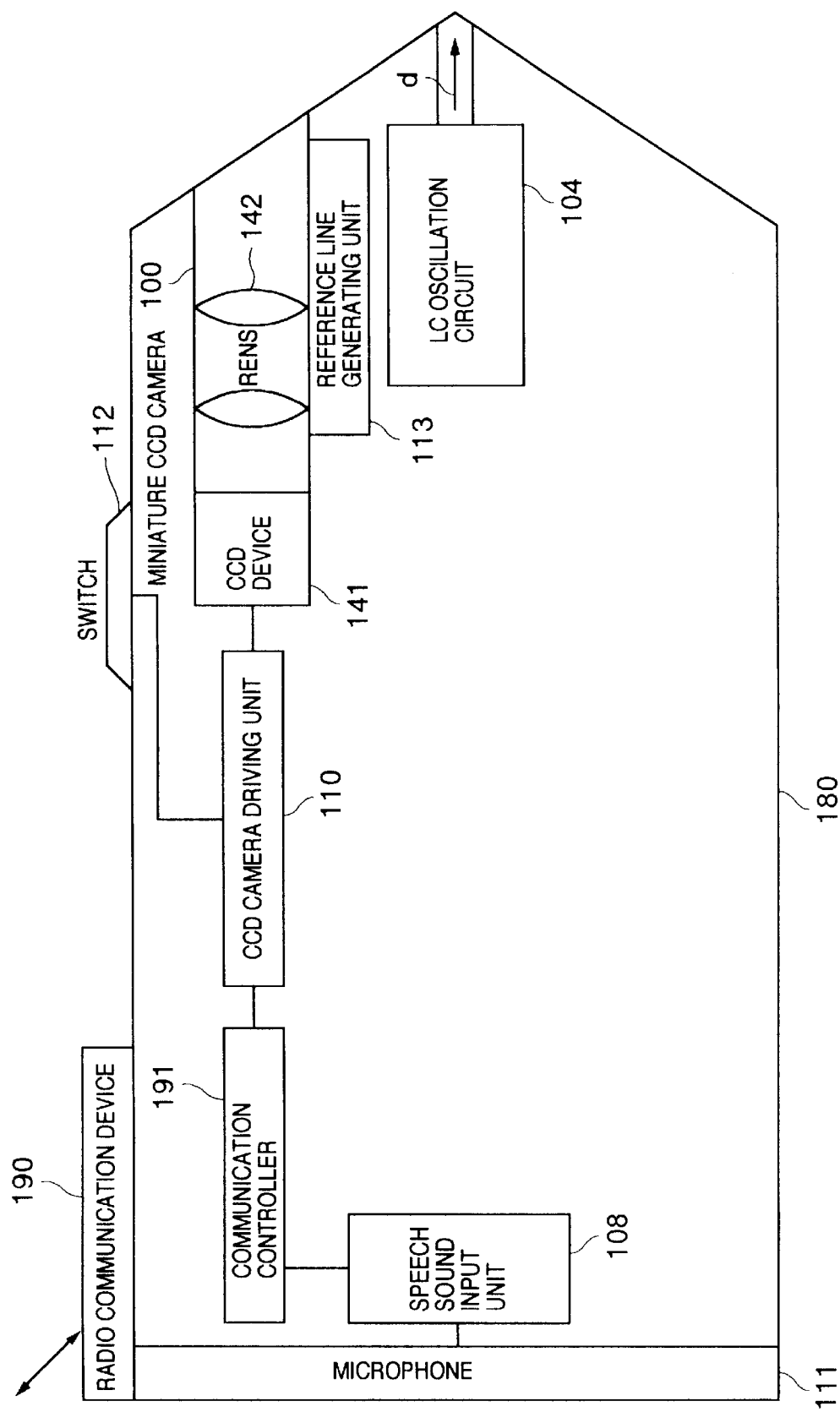
FIG. 12 is a block diagram showing a configuration of the input pen according to an embodiment of the present invention.
Figure 13:
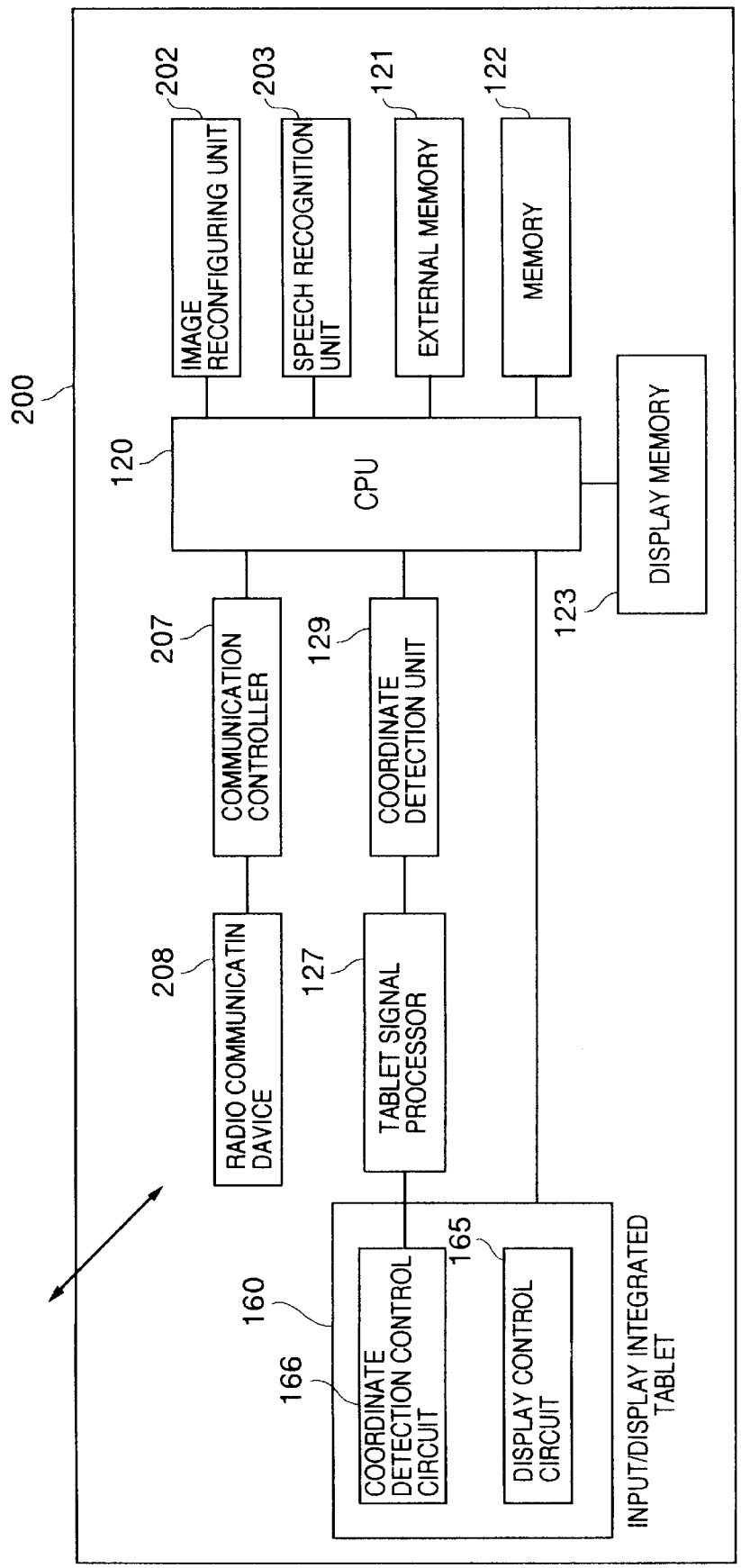
FIG. 13 is a block diagram showing a basic configuration of a tablet which is used in combination with the input pen shown in FIG. 12.

Now, in such a case, both the speech recognition portion for executing the speech recognition processing and the image correction portion for executing the image correction processing are removed from the input pen side (refer to FIG. 12), and instead thereof, a speech recognition portion 203 and an image correction portion 202 corresponding thereto, respectively, are provided in the information processor side (refer to FIG. 13).

In addition, the speech sound data which has been fetched in through the microphone 111 and the image data which has been fetched in through the CCD camera are directly transferred from the input pen side to the information processor side without through the tablet by the radio communication devices 190 and 208 which are respectively mounted to the input pen and the information processor. For this reason, the data detection unit 128 as included in the information processor shown in FIG. 11 becomes unnecessary on the information processor side as shown in FIG. 13. On the other hand, the a.c. magnetic field controlling unit 105 as included in the input pen shown in FIG. 1 becomes unnecessary on the input pen side as shown in FIG. 12. Incidentally, on the input pen side, as the a.c. magnetic field generating unit, the speech recognition portion and the image correction portion become unnecessary on the input pen side, the CPU 10 as included in the input pen shown in FIG. 1 also becomes unnecessary.

Incidentally, while in the above description, the electromagnetic induction method is employed as the tablet input method, and the CCD camera is employed as the photographing means, the present invention is not limited thereto. For example, the information processor of the present invention may be realized by employing the electrostatic induction method as the tablet input method.

In addition, wire means may also be employed for transmission of the information from the input pen to the tablet.

What is claimed is:

1. An information processor including a tablet type input unit having an input pen and a tablet for detecting a position indicated by said input pen, wherein said input pen includes:

an image pickup circuit for photographing an area in the vicinity of a pen head of said input pen;

a correction circuit for correcting deformation of an image which is photographed by said image pickup circuit; and a transmission unit for transmitting image data which is corrected by said correction circuit to said tablet, and wherein said information processor includes data detection means for restoring the image the data of which is transmitted to said tablet.

2. An information processor including a tablet type input unit having an input pen including an oscillation circuit for generating a magnetic field at a pen head or disturbing a magnetic field in the vicinity of the pen head, and a tablet for detecting the magnetic field generated by said oscillation circuit of said input pen or the magnetic field disturbed by said oscillation circuit of said input pen, wherein said input pen includes:

a CCD camera for photographing an area on a face of an object of photographing and in the vicinity of the pen head of said input pen;

irradiation means for irradiating the area, on the face of an object of photographing, which is photographed by said CCD camera, with a laser beam;

correction means for correcting distortion of an image, which is photographed by said CCD camera, generated along with inclination of said input pen with respect to the face of an object of photographing in correspondence to deformation of an image, of a projected image generated by irradiation with a laser beam emitted from said irradiation means, the image of the projected image being contained in the image on the face of an object of photographing which is photographed by said CCD camera; and oscillation circuit control means for controlling said oscillation circuit in such a way that a magnetic field representing image data of the image corrected by said correction means is generated, or a magnetic field is disturbed so as for the image data of the image corrected by said correction means to be represented, and wherein said information processor includes data detection means for restoring the image represented by the magnetic field which is detected by said tablet.

3. An information processor according to claim 2, wherein said tablet has an input face through which the magnetic field generated from said oscillation circuit of said input pen or the magnetic field disturbed by said oscillation circuit of said input pen can be detected and on which the image can be displayed, and displays the image restored by said data detection means in a position on said input face through which the magnetic field generated by said oscillation circuit on the basis of the control by said oscillation circuit control means or the magnetic field disturbed by said oscillation circuit on the basis thereof has been detected.

4. An information processor according to claim 2, wherein said input pen includes:

drive means for driving said CCD camera at predetermined timing; and general image producing means for composing the image which is continuously photographed along with the strokes of said input pen by said CCD camera driven by said drive means, and the image in which the distortion thereof is corrected, which is generated along with inclination of said input pen with respect to the face of an object of photographing, by said correction means into the general image maintaining continuity, and wherein said oscillation circuit control means controls said oscillation circuit in such a way that a magnetic field representing the image data of the general image which has been obtained by composition in said general image producing means is generated, or the magnetic field is disturbed so as for the image data of the general image which has been obtained by composition in said general image producing means to be represented.

5. An information processor including an input pen to which an image pickup circuit for photographing continuously an area in the vicinity of a pen head on a face of an object of photographing along with the strokes of said input pen is mounted, and general image producing means for composing a series of image which have been continuously photographed by said image pickup circuit into a general image, said information processor comprising correction means for correcting distortion of each of the images on the face of an object of photographing which have been continuously photographed by said image pickup circuit, wherein said general image producing means composes a series of images which have been corrected by said correction means into the general image.

6. An information processor according to claim 5, further comprising a tablet having an input face on which an image can be displayed, wherein said tablet displays the general image, which has been obtained by composition in said general image producing means, in a position on the input face in which said input pen is positioned.

7. An information processor according to claim 5, wherein said input pen includes:

a speech sound fetching unit for fetching in a speech sound giving an instruction from a user; and speech recognition means for recognizing the speech sound, which has been fetched in by said speech sound fetching unit, as a word specifying an object for photographing, and wherein said general image producing means includes:

composition means for composing a series of images, which have been corrected by said correction means, as a composite image maintaining continuity; and recognition means for extracting an image of an object for photographing, which is specified by the words recognized by said speech recognition means, from the composite image which has been produced as the general image by said composition means.

* * * * *